United States Patent
Abelard et al.

(10) Patent No.: US 11,931,793 B2
(45) Date of Patent: Mar. 19, 2024

(54) INLET LIP SKIN MANUFACTURING METHOD

(71) Applicant: CREUZET AERONAUTIQUE, Marmande (FR)

(72) Inventors: Jérôme Abelard, Saint Médard en Jalles (FR); Jean-Philippe Toschi, Grateloup (FR); Raphaël Simeon, Castelnau sur Gupie (FR); Patrick Brien, Parempuyre (FR)

(73) Assignee: Creuzet Aeronautique, Marmande (FR)

( * ) Notice: Subject to any disclaimer, the term of this patent is extended or adjusted under 35 U.S.C. 154(b) by 0 days.

(21) Appl. No.: 18/143,037

(22) Filed: May 3, 2023

(65) Prior Publication Data
US 2023/0364667 A1    Nov. 16, 2023

(30) Foreign Application Priority Data
May 12, 2022    (EP) .................................... 22305703

(51) Int. Cl.
*B21D 53/92*    (2006.01)
(52) U.S. Cl.
CPC .................................... *B21D 53/92* (2013.01)
(58) Field of Classification Search
CPC . B21D 53/92; B64F 5/10; B64D 29/00; F02C 7/04
See application file for complete search history.

(56) References Cited

U.S. PATENT DOCUMENTS

| | | | | |
|---|---|---|---|---|
| 7,334,447 B1 * | 2/2008 | Kulkarni | ................ | B21D 22/24 |
| | | | | 72/347 |
| 7,340,933 B2 * | 3/2008 | Stewart | ................ | B21D 25/02 |
| | | | | 72/466.2 |

(Continued)

FOREIGN PATENT DOCUMENTS

| EP | 1820578 | 8/2007 |
|---|---|---|
| EP | 3156333 | 4/2017 |

(Continued)

OTHER PUBLICATIONS

WO-2022084630-A1 machine translation (Year: 2022).*

(Continued)

*Primary Examiner* — Michael W Hotchkiss
(74) *Attorney, Agent, or Firm* — Henricks Slavin LLP

(57) ABSTRACT

The invention relates to a method for manufacturing an inlet lip skin part according to a nominal definition comprising dimensions of the lip skin and associated tolerances, the method comprising the steps of:
a) obtaining at least one blank from at least one metal sheet;
b) deforming the at least one blank into an intermediate part; and
c) machining a first surface of the intermediate part with a first machining path, said first machining path being independent of the real dimensions of the intermediate part, and being based on the nominal definition of the lip skin part, so as to obtain a semi-machined part, and
d) machining a second surface of the semi-machined part with a second machining path, said second machining path being based on real dimensions of the semi-machined part and the nominal definition of the lip skin part.

15 Claims, 2 Drawing Sheets

(56) References Cited

U.S. PATENT DOCUMENTS

| | | | | |
|---|---|---|---|---|
| 9,021,848 B2* | 5/2015 | Leacock | ................ | B21D 25/04 72/296 |
| 9,845,728 B2* | 12/2017 | Brown | ................... | B23K 20/12 |
| 9,975,162 B2* | 5/2018 | Ludlow | ................ | E21B 47/085 |
| 10,427,197 B2* | 10/2019 | Ludlow | ................ | B21D 11/02 |
| 10,843,291 B2* | 11/2020 | Sanders | ............... | B23K 26/24 |
| 10,875,079 B2* | 12/2020 | Ludlow | ................ | B21D 53/92 |
| 11,065,668 B2* | 7/2021 | Douglas | ................ | B23P 15/04 |
| 11,447,228 B2* | 9/2022 | Bolin | ...................... | B64F 5/10 |
| 11,872,617 B2* | 1/2024 | Quenu | ................ | B21D 26/033 |
| 2002/0062675 A1* | 5/2002 | Naaktgeboren | ........ | B21D 25/02 72/296 |
| 2006/0086774 A1* | 4/2006 | Sanders | .............. | B21D 26/055 228/112.1 |
| 2008/0280156 A1* | 11/2008 | Eilert | ..................... | B29C 51/10 428/542.8 |
| 2011/0162429 A1* | 7/2011 | Leacock | ................ | B21D 25/04 72/296 |
| 2018/0093316 A1* | 4/2018 | Leacock | ................ | B21D 22/18 |
| 2018/0236526 A1* | 8/2018 | Ludlow | ................ | B21D 25/02 |
| 2018/0245454 A1* | 8/2018 | Ludlow | ................ | B21D 25/04 |
| 2019/0184443 A1* | 6/2019 | Morganti | ................. | C22F 1/04 |
| 2020/0114409 A1* | 4/2020 | Graham | ............... | B21D 31/005 |
| 2020/0130856 A1* | 4/2020 | West | ......................... | F02C 7/04 |
| 2020/0246859 A1* | 8/2020 | Douglas | ................... | B64F 5/10 |
| 2020/0353556 A1* | 11/2020 | Leon | ...................... | C22C 21/00 |
| 2021/0237139 A1* | 8/2021 | Douglas | ................ | B21D 22/22 |
| 2023/0287835 A1* | 9/2023 | Quenu | ..................... | B64F 5/10 |

FOREIGN PATENT DOCUMENTS

| | | |
|---|---|---|
| NL | 1042952 | 2/2020 |
| NL | 1042952 B1 * | 2/2020 |
| WO | WO 2022/084629 | 4/2022 |
| WO | WO-2022084630 A1 * | 4/2022 |

OTHER PUBLICATIONS

NL-1042952-B1 machine translation (Year: 2022).*

Plastiras, Dimitrios, European Search Report, dated Oct. 18, 2022, 6 pages, European Patent Office, Rijswijk, Netherlands.

* cited by examiner

INLET LIP SKIN MANUFACTURING METHOD

The invention relates to a method for manufacturing inlet lip skins from sheet metal. An inlet lip skin, also known as a nacelle lip skin, is the front cover of an aircraft engine. It has a complex shape with compound curvatures and has usually a diameter of several meters.

FIG. 1 shows a known nacelle lip skin 10 as described in patent EP1820578. The lip skin 10 has roughly a shape of a half torus, with an outside convex surface, and an inner concave surface. In this patent, the lip skin is formed by four noselip segments 12, each segment including a spanwise axis 14 about which the noselip segment skin curves in a chordwise direction. In addition, the lip skin 10 and noselip segment 12 includes a chordwise central axis 16, about which the lip skin/noselip segment curve in a spanwise direction. In FIG. 1, the chordwise axis 16 coincides with a central longitudinal axis of an associated aircraft engine, and the center of the engine's inlet.

To manufacture the lip skin, the lip skin designer defines the dimensions and tolerances in an 2D engineering drawing, or a 3D nominal CAD file, comprising the nominal dimensions and associated tolerances, that is to say the allowable variations for each nominal dimension. Tolerances on lip skin shape are very demanding since they are typically less than 3 mm, and tolerances on thickness are typically less than 0.5 mm.

A major problem in producing lip skins is to obtain large pieces from sheet metal while ensuring the dimensions and tolerances are met. A manufacturing process including sheet metal deformation at room temperature require use of several presses and tooling with numerous deformation steps, leading to few repeatable dimensions. A manufacturing process including hot forming requires subsequent cooling steps and heat treatments, as the cooling steps deform the hot formed part in several directions.

With known techniques it is difficult to manufacture the lip skin with sufficient repeatability and very fine accuracy. Accuracy and repeatability are therefore important bottlenecks in producing lip skins using conventional techniques.

The object of the invention is to provide a method for manufacturing a lip skin, which at least partially eliminates the above-mentioned drawbacks of the known manufacturing techniques. More particularly, it is an object of the invention to provide a method wherein the accuracy and repeatability are improved over known manufacturing techniques.

To this end, the invention provides a method for manufacturing an inlet lip skin part according to a nominal definition of the inlet lip skin part, the nominal definition comprising dimensions of the lipskin and associated tolerances, the method comprising the steps of:
  a) obtaining at least one blank from at least one metal sheet;
  b) deforming the at least one blank into an intermediate part; and
  c) machining a first surface of the intermediate part with a first machining path, said first machining path being independent of the real dimensions of the intermediate part, and being based on the nominal definition of the lip skin, so as to obtain a semi-machined part, and
  d) machining a second surface of the semi-machined part with a second machining path, said second machining path being based on real dimensions of the semi-machined part and the nominal definition.

According to the invention, in a first step a) a blank is obtained from a metal sheet, for instance aluminum or titanium sheet. Several metal sheets may be welded together to form a larger metal sheet and may be then cut such as to provide the blank so as to form a circular blank with a circular hole. In another embodiment, at least one metal sheet may be cut so as to provide at least two annular segments and may be then welded together to form the blank so as to form a circular blank with a circular hole. In another embodiment, one metal sheet may be cut so as to provide an annular segment.

The blank may be manufactured so as to provide gripping means for handling and/or maintaining the blank and/or the intermediate part and/or the semi-machined part during the deforming and/or the machining step. Such means can be at least one lug provided at a periphery of the blank, an internal headband provided at an internal periphery of the blank, or an external heat band provided at an external periphery of the blank. In one embodiment, at least one datum may be provided on at least one headband and/or on the semi-machined part.

In a next step b) the blank is deformed into an intermediate shape of the lip skin part. The intermediate part does not yet have the final dimensions and shape of the lip skin, but has the required curvatures and thicknesses allowing subsequent machining.

The deformation is a mechanical deformation step, for example with a press at room temperature, or hot forming deformation at a temperature between 400° C. and 950° C., or spin forming deformation, or explosive deformation or a combination thereof, in one step or several sub-steps. According to the chosen forming process, intermediate heat treatment might be required to release the stresses induced by the manufacturing process before machining.

In step c) the intermediate shape is machined to the final shape according to the nominal definition. Machining in this description is understood to mean that a material is cut to a desired final shape and size by a controlled material-removal process, such as turning or milling, using machine tools.

Advanced machining techniques include precision CNC machining, electrical discharge machining (EDM), electrochemical machining (ECM), laser cutting, or water jet cutting to shape metal workpieces. The use of the appropriate technique depends on the lip skin dimension tolerances to be met, as each tool has its own manufacturing tolerance.

The nominal definition of the inlet lip skin part may be a nominal CAD file. Machining a first surface of the intermediate part may comprise acquiring dimensions of the intermediate part, building a first CAD file containing dimensions of the intermediate parts and best-fit the nominal CAD file in the first CAD file.

In one embodiment, acquisition of the dimensions of the intermediate part can be performed with an optical measurement device scanning the intermediate part, or with ultrasound probes sensing some points on the intermediate part.

In one embodiment, machining the second surface of the semi-machined part may comprise acquiring dimensions of the semi-machined part and building a second CAD file containing dimensions of the semi-machined part.

In one embodiment, acquiring dimensions of the semi-machined part may comprise acquiring a thickness of the semi-machined part, such thickness being measured on the semi-machined part with ultrasound probes.

In one embodiment, the first surface is an outside convex surface, and the second surface is an inside concave surface.

In one embodiment, the first surface is an inside concave surface, and the second surface is an outside convex surface.

The combination of a first deformation step with a two steps machining reduces the accuracy and repeatability problems of the prior art. After the machining, the accuracy is so good that no further corrective surface treatments or dimensional rectification operations on the lip skin are necessary. This further contributes to the repeatability of the process with the same product accuracy. The avoidance of such additional steps contributes to a reduction in production costs and reduces manufacturing time.

The invention is described below with reference to the drawings, in which:

FIG. 2 shows the manufacturing process of an inlet lip skin with preferred steps in bold lines and optional steps in dashed lines. In step 20, an aluminum alloy sheet metal is provided, for instance a 2219 aluminum alloy sheet metal.

Figures 1, 4:
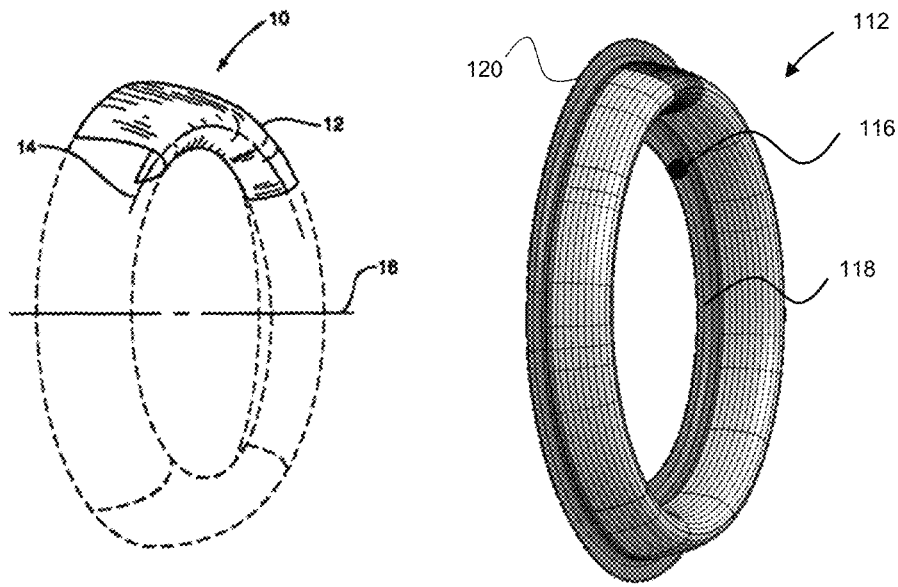
FIG. 1 is a perspective view of an inlet lip skin.
FIG. 4 is a perspective view of an intermediate lip skin part.
Figure 2:
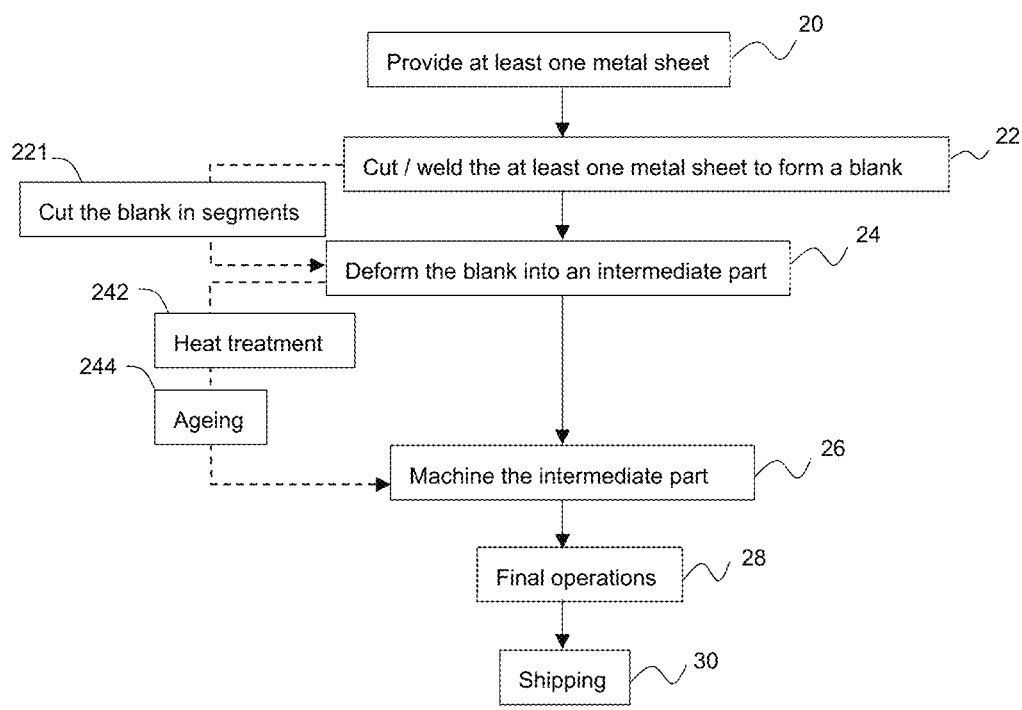
FIG. 2 is a flow chart of a manufacturing method of an inlet lip skin according to the invention.

Typically, the sheet metal must have a minimum thickness as specified in the lip skin nominal definition, such as a 2D engineering drawing or a nominal CAD file, plus a minimum thickness to provide enough material for subsequent machining. For instance, a single Al-2219 sheet must have a nominal thickness from about 4 mm to 6 mm and minimum dimensions of 3000 mm by 3000 mm in order to manufacture a lip skin having an average thickness of 2 mm and a maximum diameter of 2400 mm. According to the final dimension of the lip skin or the availability of the metal sheets, the sheet metal may be supplied in one piece or may be formed by welding several smaller metal sheets to form a larger sheet of the desired dimensions.

In step 22, at least one sheet metal is cut into a blank having for instance an annular shape with a hole in the center. The blank shape does not necessarily have to be circular and symmetrical, it can be elliptic.

In an optional further step 221, the blank may be cut into two, three, four or more segments which can be later welded together to form the lip skin 10. In this case, the blank that will be processed in the next steps is a blank segment, the intermediate part is an intermediate segment, and the semi-machined part is a semi-machined segment.

The blank is then deformed in one or more deformation steps 24 into an intermediate part 112. If necessary, heat treatments are performed between the forming steps.

The deformation can be performed by cold forming, for instance in one or more dies with several tooling with different shapes, by hot forming, for instance in a closed die with an upper and a lower die, after the blank 110 and tooling have been heated and transferred into a closed die, by explosive forming, by spin forming, or by a combination of these techniques.

After deformation, in optional step 242, the intermediate part 112 can be heat treated, i.e. solution annealed and/or quenched to relieve stresses induced by the deformation.

In a further optional step 244, the intermediate part 112 may be submitted to an ageing to obtain final mechanical performances.

Advantageously, the blank can be gripped during deformation on lugs or the outer periphery of the blank and/or the inner periphery, to allow the deformation of the annular portion in a half-torus shape. The peripheries stay planar during the deformation and form headbands 118, 120.

At least one marking can be performed during the blank manufacturing step or the deformation step to create at least one datum 116, that will be used in the subsequent machining step, for aligning the intermediate lip skin or the semi-machined lip skin, as it will be detailed thereafter. The datum 116 may be formed by one or several holes, slits, dots, lines.

After deformation and optional steps, the intermediate part 112 has the shape shown in FIG. 4. In FIG. 4, the intermediate part 112 has an internal headband 118 at the internal periphery of the deformed annular portion, an external headband 120 at the external periphery of the deformed annular portion, and one datum 116 is provided on the internal headband 118.

In step 26, the intermediate part 112 is machined into a lip skin 10 having the final desired shape and dimensions, meeting the requirement of the definition.

The lip skin 10 undergoes final operations 28 such as cosmetic polishing, dimension inspection, cosmetic inspection, laboratory tests and surface treatments before shipping 30.

Figure 3:
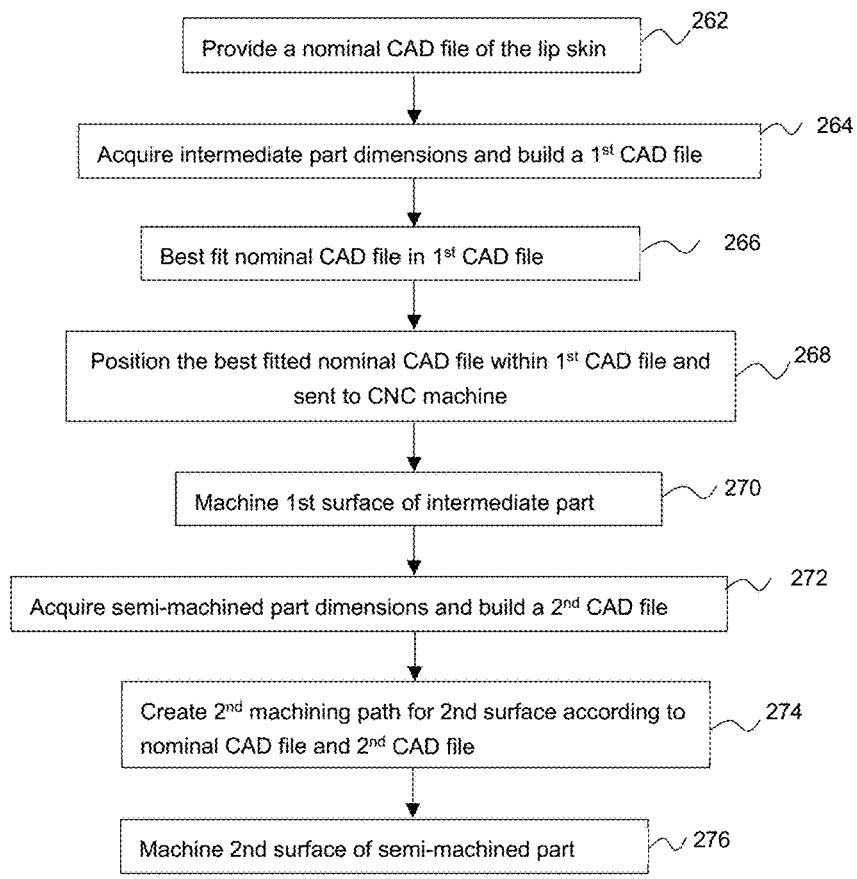
FIG. 3 is a flow chart of the machining step of the manufacturing method of FIG. 2.
Figure 5:
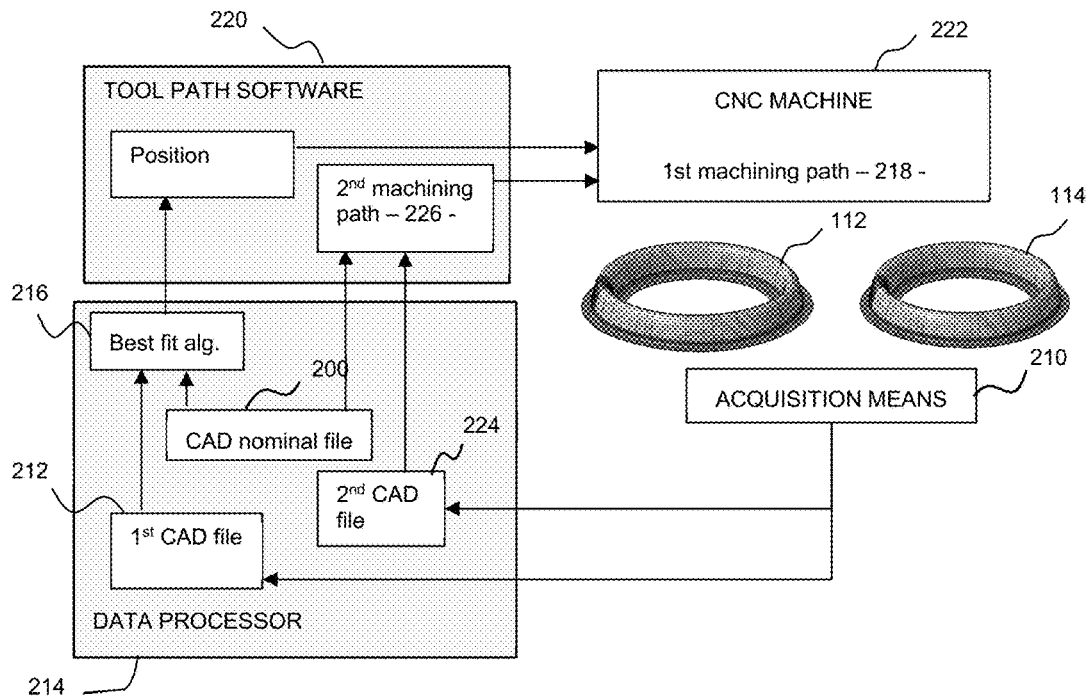
FIG. 5 is a conceptual and schematic diagram illustrating an example system used in the machining step.

FIG. 3 shows in more details the machining step 26, and FIG. 5 shows a system used to perform such step.

Step 26 is mainly divided into two sub-steps:
A first surface, for instance the outside convex surface of the intermediate part 112 is machined into a semi-machined part 114, and then
A second surface, for instance the inside concave surface of the semi-machined part 114 is machined into a finished part, the lip skin 10.

In step 262, the nominal definition of the inlet lip skin 10 is provided, preferentially as a nominal CAD file 200 defining the values in a cartesian system (X, Y, Z) of several thousands of points, with associated tolerances of the lip skin. The nominal CAD file 200 defines mainly two surfaces, a nominal outside convex surface and a nominal inside concave surface, and a nominal thickness between those two surfaces. The tolerances are values in the cartesian system (X, Y, Z) of the points lying in one surface. Typically, a tolerance interval is a range of acceptable dimensions defined by a minimum value and a maximum value in the cartesian system (X, Y, Z), the nominal dimension of a point lying in the tolerance interval. The definition contains also at least one datum to allow alignment of the intermediate manufactured parts.

In step 264, the dimensions of the intermediate part 112—either in the shape of an annular part or in the shape of an annular segment part—are acquired by acquisition means 210. The acquisition means may be an optical measurement device scanning the overall intermediate part 112, or ultrasound probes, sensing some points on the intermediate part 112, either on the outside surface, either on the inside surface, or both.

The acquisition means 210 is in data communication with a data processor 214. The data processor is remotely located on a computer or integrated in the CNC machine and is able to build CAD files using the measured raw data. The data processor 214 builds a first CAD file 212 corresponding to the intermediate part 112 from the measured raw data. The data processor includes of course a memory for storing the raw data, CAD files, generated data, instruction sets, algorithms, codes, etc. used for and generated during the manufacturing process.

It has to be noted that steps 262 and 264 are not necessary performed one after the other. Step 264 can be performed before, or in parallel, to step 262.

In step 266, a "Best fit" step of the first CAD file 212 with the nominal CAD file 200 is carried out by the data processor 214. Best fit is a virtual operation aiming to align position of the first CAD file 212 with the nominal CAD file 200 so that:

the whole nominal CAD file 200 is contained entirely in the lip skin first CAD file 212, and no thickness between a surface of the nominal CAD file 200 and an adjacent surface of the first CAD file 212 is less than a given minimum thickness, defined according to the tolerances of the nominal definition and manufacturing tolerances of the machining tool. For instance, if at any point, the dimensions tolerance interval is 0.5 mm and the manufacturing tolerance of the machining tool is 0.1 mm, then any thickness between any surface of nominal CAD file 200 and surface of the first CAD file could be at least of 0.35 mm if the nominal point is in the middle of the dimensions tolerance interval.

To achieve the best-fit between both parts, a best-fit algorithm 216 determines a transformation rule for rigid body transformation consisting in three deflections, and possibly one to three rotations.

In order to position the nominal CAD file of the lip skin within the first CAD file, the intermediate part 112 preferentially includes at least one datum 116 (FIG. 4), formed for instance during or after the deformation of the blank.

Once the datums of the nominal CAD file and the first CAD file are aligned, and the thickness at any point between both files is more than a given minimum thickness defined for this point, the nominal CAD file 200 of the lip skin is "best-fitted". In step 268, the position in the cartesian system (X, Y, Z) of the nominal CAD file within the first CDA file is determined and sent to a CNC machine 222.

The intermediate part is inserted in the CNC machine 222, preferentially on a tool having the shape of a half-torus onto which the intermediate part can be put. The CNC machine contains a first machining path 218 for machining the outside surface of the lipskin. This machining path is defined by a tool path software 220 that generates codes for numerical controlled machines. The first machining path is based on the nominal CAD file and is used to machine any intermediate part produced in the manufacturing process of lip skins having the same nominal definition. The first machining path is independent of the real dimensions of the intermediate part 112.

It has to be noted that the intermediate part may be inserted in the CNC machine in step 264 if this CNC machine comprises the acquisition means 210.

In step 270, the CNC machine machines the outside convex surface of the intermediate part 112 into a finished surface with dimensions identical to the nominal dimensions of the outside convex surface, within the allowed tolerances permitted by the nominal CAD file of the lip skin, according to the pre-defined machining path 218. At the end of step 270, a semi-machined part 114 is obtained. During this step, one or both headbands may be cut. If a headband containing a datum is removed, one or more new datums can be made on the intermediate part during or after the machining step for positioning the semi-machined part within the CNC machine for the subsequent machining step. The new datum may be a hole or a visual marking, such as a scratch.

In step 272, the dimensions of the semi-machined part 114 are acquired. The same measuring device 210 than the one used for acquiring the dimensions of the intermediate part 112 can be used.

In one example, the measurement is done by sensing some points of the finished outside convex surface of the semi-machine part 114 and assessing the thicknesses at these same points, for instance using ultrasonic sensors. The set of measurements is used by the data processor 214 to create a second CAD file 224 containing the real dimensions of the semi-machined part 114.

The semi-machined part 114 is inserted in the CNC machine 222 and its position is acquired.

In step 274, a second machining path 226 for machining the inside concave surface is created by the tool path software 220, based on the second CAD file, that is to say the real dimensions of the semi-machined part 114, the position of the semi-machined part within the CNC machine 222, and the nominal CAD file. This second machining path 226 is unique as it is created for each semi-machined part, by taking in account the unique dimensions of the semi-machined part 114.

In step 276, the second machining path 226 is sent to the CNC machine 222 that machines the inside concave surface of the semi-machined part 114 into a finished surface with dimensions identical to the nominal dimensions, within the allowed tolerances permitted by the nominal CAD file 200 of the lip skin.

After step 276, the lugs or headbands that might remain are cut and the full machined part forms the complete inlet lip skin 10 having the desired final dimensions and shape, meeting the requirements of the nominal CAD file 200, within the required tolerances.

In the embodiment where the process is applied to lip skin segments 12, the segments may be welded together in an additional optional step, for example by means of friction stir welding, or they may be supplied as such to the customer which will assemble them, for instance with fasteners.

While the machining step 26 described above begins with machining first the outside convex surface of the intermediate part, it could as well begin with machining first the inside concave surface of the intermediate part. In this case, the first machining path 218 would be the one for machining the inside surface and would be used for any intermediate part. The second machining path 226 for machining the outside surface would be created for each semi-machined part.

The advantage of this method is that the lip skins 10 are made with a high degree of accuracy and are repeatable in an efficient way since only one machining path is created for each part, even if each intermediate part 112 and semi-machined part 114 have unique dimensions.

The invention claimed is:

1. Method for manufacturing an inlet lip skin according to a nominal definition of the inlet lip skin, the nominal definition comprising dimensions of the lip skin and associated tolerances, the method comprising the steps of:
  a) obtaining at least one blank from at least one metal sheet;
  b) deforming the at least one blank into an intermediate part; and
  c) machining a first surface of the intermediate part with a first machining path, said first machining path being independent of actual dimensions of the intermediate part, and being based on the nominal definition of the lip skin, so as to obtain a semi-machined part, and
  d) machining a second surface of the semi-machined part with a second machining path, said second machining path being based on actual dimensions of the semi-machined part and the nominal definition of the lip skin.

2. Method for manufacturing an inlet lip skin according to claim 1, wherein the at least one metal sheet is an aluminum or titanium sheet.

3. Method for manufacturing an inlet lip skin according to claim 1, wherein a plurality of metal sheets are welded together to form a larger metal sheet and are then cut such as to provide the blank so as to form a circular blank with a circular hole.

4. Method for manufacturing an inlet lip skin according to claim 1, wherein at least one metal sheet is cut so as to provide at least two annular segments and are then welded together to form the blank so as to form a circular blank with a circular hole.

5. Method for manufacturing an inlet lip skin according to claim 1, wherein one metal sheet is cut so as to provide the blank as an annular segment part.

6. Method for manufacturing an inlet lip skin according to claim 1, wherein at least one datum is provided on at least one of a lug and/or headband and/or the semi-machined part.

7. Method for manufacturing an inlet lip skin according to claim 1, wherein deforming the blank includes a mechanical deformation with at least one of a press at room temperature, or a hot forming deformation at a temperature between 400° C. and 950° C., or a spin forming deformation, or an explosive deformation or a combination thereof, in one step or several sub-steps.

8. Method for manufacturing an inlet lip skin according to claim 1, wherein the first surface is an outside convex surface, and the second surface is an inside concave surface.

9. Method for manufacturing an inlet lip skin according to claim 1, wherein the first surface is an inside concave surface, and the second surface is an outside convex surface.

10. Method for manufacturing an inlet lip skin according to claim 1, wherein the blank is manufactured so as to provide gripping means for at least one of handling and/or maintaining the blank and/or the intermediate part and/or the semi-machined part during the deforming and/or the machining step.

11. Method for manufacturing an inlet lip skin according to claim 10, wherein the gripping means include at least one of a lug provided at a periphery of the blank, or an internal headband provided at the internal periphery of the blank, or an external headband provided at the external periphery of the blank.

12. Method for manufacturing an inlet lip skin according to claim 1, wherein the nominal definition of the inlet lip skin is a nominal CAD file, and wherein machining a first surface of the intermediate part comprises acquiring dimensions of the intermediate part, building a first CAD file containing dimensions of the intermediate parts and best-fit the nominal CAD file in the first CAD file.

13. Method for manufacturing an inlet lip skin according to claim 12, wherein acquiring dimensions of the intermediate part is performed with at least one of an optical measurement device scanning the intermediate part, or with ultrasound probes sensing some points on the intermediate part.

14. Method for manufacturing an inlet lip skin according to claim 1, wherein machining the second surface of the semi-machined part comprises acquiring dimensions of the semi-machined part and building a second CAD file containing dimensions of the semi-machined part.

15. Method for manufacturing an inlet lip skin according to claim 14, wherein acquiring dimensions of the semi-machined part comprises acquiring a thickness of the semi-machined part, such thickness being measured on the semi-machined part with ultrasound probes.

* * * * *